(12) United States Patent
Köhler et al.

(10) Patent No.: US 7,175,011 B2
(45) Date of Patent: Feb. 13, 2007

(54) FREE-WHEEL WITH A FREE-WHEEL OUTER RIM COVERED WITH FIBER-REINFORCED PLASTIC

(75) Inventors: Eberhard Köhler, Chemnitz (DE); Holger Frei, Brand-Erbisdorf (DE); Eberhard Karl, Spardorf (DE); Manfred Elbacher, Nürnberg (DE)

(73) Assignee: Paul Mueller GmbH & Co. KG Unternehmensbeteiligungen, Nuremberg (DE)

( * ) Notice: Subject to any disclaimer, the term of this patent is extended or adjusted under 35 U.S.C. 154(b) by 42 days.

(21) Appl. No.: 10/489,562

(22) PCT Filed: Aug. 28, 2002

(86) PCT No.: PCT/DE02/03161

§ 371 (c)(1),
(2), (4) Date: Sep. 21, 2004

(87) PCT Pub. No.: WO03/025411

PCT Pub. Date: Mar. 27, 2003

(65) Prior Publication Data

US 2005/0016812 A1  Jan. 27, 2005

(30) Foreign Application Priority Data

Sep. 7, 2001  (DE) .................. 101 44 032

(51) Int. Cl.
*F16D 41/07* (2006.01)

(52) U.S. Cl. .............................. 192/45.1; 192/107 M; 192/107 T

(58) Field of Classification Search .................... None
See application file for complete search history.

(56) References Cited

U.S. PATENT DOCUMENTS

| 4,370,899 | A | * | 2/1983 | Swartout ................ 74/572.12 |
| 4,817,453 | A | * | 4/1989 | Breslich et al. ............ 74/572.4 |
| 5,760,514 | A | * | 6/1998 | Taniguchi et al. ......... 192/45.1 |
| 6,247,382 | B1 | * | 6/2001 | Umeki et al. ............ 74/572.12 |
| 2004/0185733 | A1 | * | 9/2004 | Murai et al. ................ 442/265 |

FOREIGN PATENT DOCUMENTS

| EP | 0 484 583 | 5/1992 |
| EP | 0 550 971 | 7/1993 |
| FR | 1 566 763 | 5/1969 |

* cited by examiner

*Primary Examiner*—Rodney H. Bonck
(74) *Attorney, Agent, or Firm*—Collard & Roe, P.C.

(57) ABSTRACT

The invention relates to a free-wheel, in particular a pinch roller free-wheel or a pinch body free-wheel, comprising relatively-rotating elements arranged one within the other on a common axis, which form a gap, in which pinch elements, in particular pinch rollers or pinch bodies, are arranged such that a friction connection can be produced with the facing outer surfaces of the elements, by means of the pinch surfaces, whereby the free-wheel outer rim is covered by a ring of fibre-reinforced plastic and the external diameter of the ring of fibre-reinforced plastic is about 1.3 to 1.8 times the diameter of the external clamping surface.

8 Claims, 5 Drawing Sheets

FREE-WHEEL WITH A FREE-WHEEL OUTER RIM COVERED WITH FIBER-REINFORCED PLASTIC

CROSS REFERENCE TO RELATED APPLICATIONS

Figure 1:
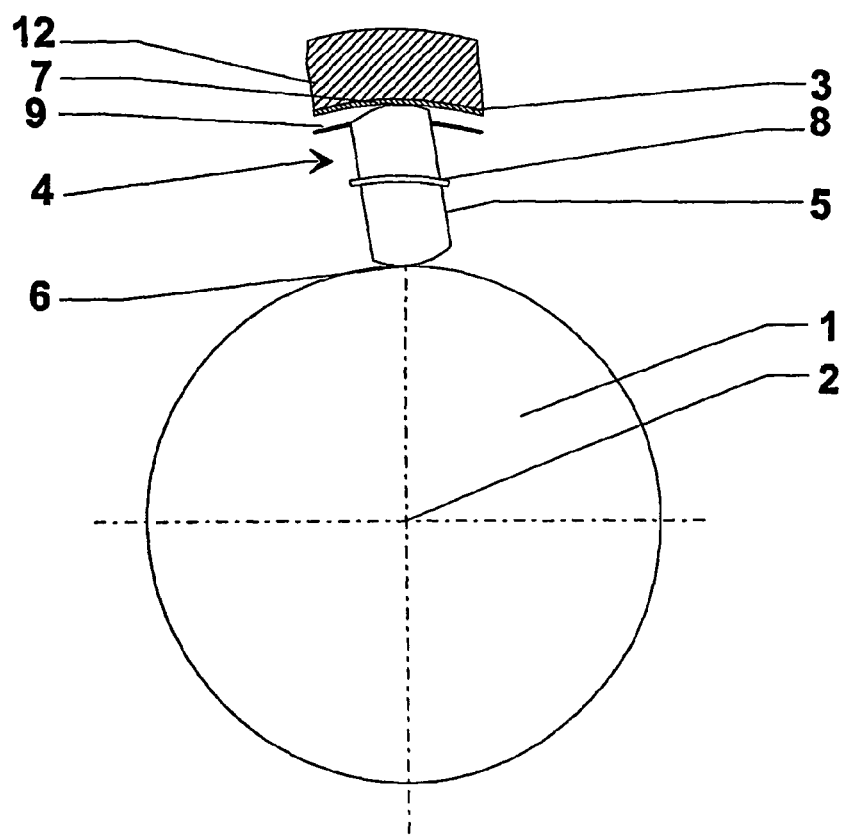

Applicants claim priority under 35 U.S.C. 119 of German Patent Application No. 101 44 032.4 filed Sep. 7, 2001. Applicant also claims priority under 35 U.S.C. §365 of PCT/DE02/03161 filed Aug. 28, 2002. The international application under PCT article 21 (2) was not published in English.

The invention relates to a free-wheel, in particular a pinch roller free-wheel or a pinch body free-wheel having elements which can rotate with respect to one another about a common axis, are arranged one inside the other and form a gap in which pinch elements, in particular pinch rollers or pinch bodies are arranged in such a way that a frictionally locking connection can be brought about with the facing outer surfaces of the elements, in particular pinch rollers or pinch bodies are arranged in such a way that a frictionally locking connection cab be brought about with the facing outer surfaces of the elements by means of the clamping surfaces.

Clamping free-wheels are components which are frequently used in technology. They are used primarily as a directional clutch or overrunning clutch, a reversing lock and a gear-shifting free-wheel. The torque which can be transmitted by a free-wheel depends decisively on the design of the shaft and of the outer ring of the free-wheel. The torque which can be transmitted is often limited by the widening of the gap between the shaft and the outer ring of the free-wheel. Reducing the widening of the outer ring of the free-wheel can thus lead to an increase in the torque of the free-wheel.

The invention is based on the object of providing a free-wheel in which undesired widening of the outer ring of the free-wheel is reduced or avoided. The object is achieved by a free-wheel, in particular a pinch roller free-wheel or a pinch body free-wheel having elements which can rotate with respect to one another about a common axis, are arranged one inside the other and form a gap in which pinch elements, in particular pinch rollers or pinch bodies are arranged in such a way that a frictionally locking connection can be brought about with the facing outer surfaces of the elements, in particular pinch rollers or pinch bodies are arranged in such a way that a frictionally locking connection cab be brought about with the facing outer surfaces of the elements by means of the clamping surfaces, wherein a ring made of fiber-reinforced plastic is wound around the outer ring of the free-wheel and the external diameter of the ring made of fiber-reinforced plastic is approximately 1.3 to 1.8 times the diameter of the external clamping surface. Advantageous developments of the invention are described below.

In the free-wheel according to the invention, a ring made of fiber-reinforced plastic is wound around the outer ring of the free-wheel. For this purpose, the outer ring of the free-wheel which is in particular cured is additionally wound, after the curing process, with at least one ring made of fiber-reinforced plastic over individual ring width regions or the entire width of the ring, or the ring made of fiber-reinforced plastic is wound into at least one circumferential groove which is formed in the outer ring of the free-wheel before the curing. It is also possible to provide a plurality of circumferential grooves in the outer ring of the free-wheel. The circumferential groove is to be shaped in such a way here that the cured outer ring of the free-wheel can be used as a coil former for winding on the ring made of fiber-reinforced plastic. The fibers are wound on a winding machine with appropriate prestress.

The position of the fibers is advantageously essentially unidirectional here and about one axis in the circumferential direction so that the high modulus of elasticity of the fiber is utilized. As a result, widening of the outer ring of the free-wheel is counteracted in an optimum way owing to the contact force of a pinch body. This results in a higher transmissible torque since the pinch body rolls in less far owing to the smaller degree of widening of a gap between a shaft and the outer ring of the free-wheel, and the permitted compressive load per unit area is, at the same time, used better.

The thickness of the outer ring of the free-wheel and the depth of the circumferential groove depend here on the torque to be achieved and the size of the compressive load per unit area between an external clamping face of the pinch body and the outer ring of the free-wheel. The compressive surface loading is to be prevented from acting on the wound-on ring made of fiber-reinforced plastic via the outer ring of the free-wheel.

The height of the ring made of fiber-reinforced plastic should not exceed the depth of the circumferential groove in the outer ring of the free-wheel. This is ensured by virtue of the fact that fitting surfaces, which can also be arranged between adjacent grooves, permit the outer ring of the free-wheel to be introduced into a corresponding housing without damaging the fibers. The width of the circumferential groove, and thus of the ring made of fiber-reinforced plastic, can advantageously be equal to the width of the clamp body or exceed it. The ring made of fiber-reinforced plastic is thus wound in such a way that the entire width of the circumferential groove is filled with fibers.

The free-wheel according to the invention has a ring made of fiber-reinforced plastic which is constructed so as to be considerably strengthened in comparison with the outer ring of the free-wheel. The external diameter of the outer ring of the free-wheel is here approximately 1.02 to 1.1 times the diameter of the external clamping surface. Here, the external diameter of the ring made of fiber-reinforced plastic is approximately 1.3 to 1.8 times the diameter of the external clamping surface of the free-wheel according to the invention. This produces a free-wheel with an outer ring free-wheel covering which is embodied in a filigree fashion in comparison with the ring made of fiber-reinforced plastic. The combination of an outer ring of a free-wheel which is of such thin design with a ring made of fiber-reinforced plastic which is reinforced in this way has proven particularly resistant to loading and durable during vibration testing.

The object can be used in order to counteract the radial widening of steel rings owing to internal loading such as internal pressure, compressive surface loading or contact forces. The additional reduction in mass makes it possible to apply the invention also to rings which rotate at high speed and are thus dynamically loaded.

Figure 2:
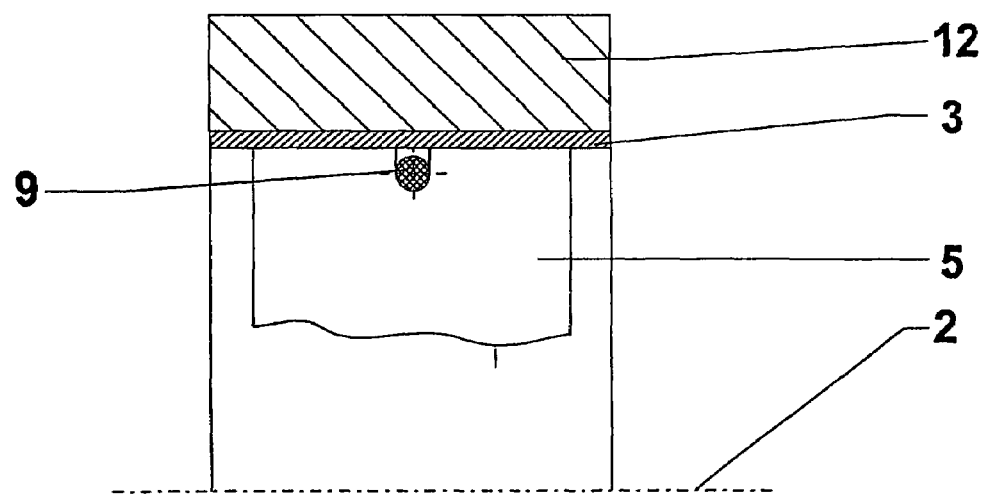
Figure 3:
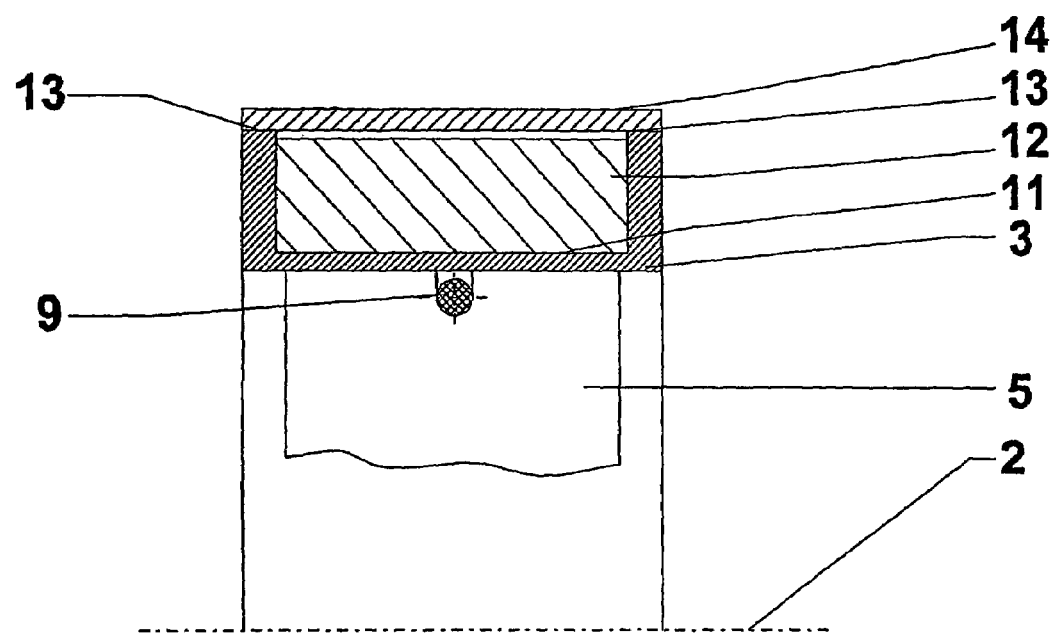
Figure 4:
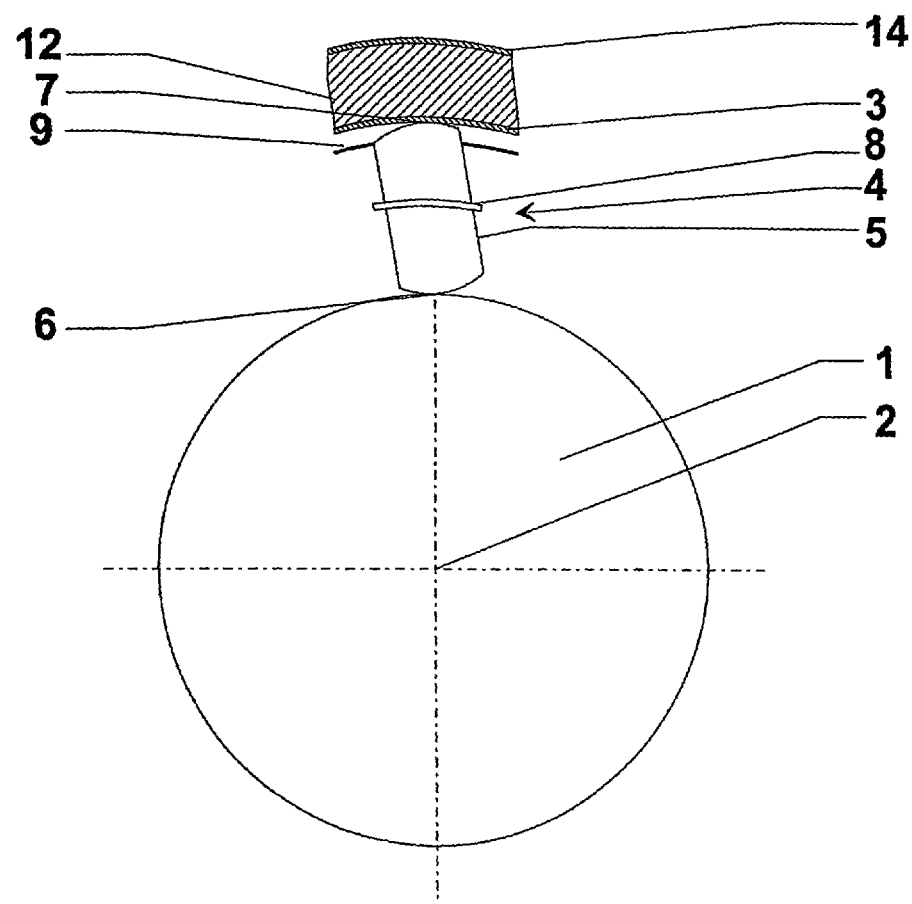
Figure 5:
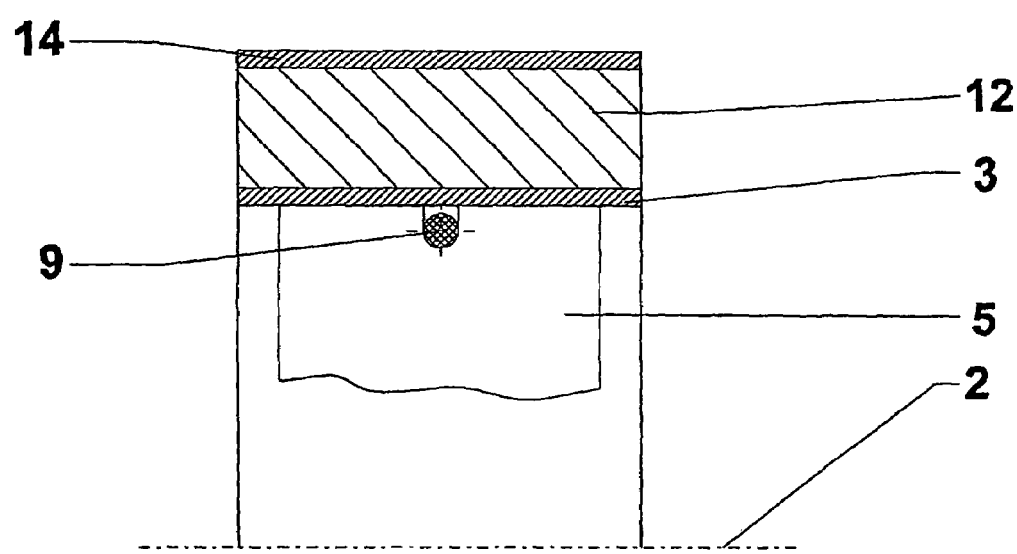

The embodiment according to the invention will be explained in more detail below with reference to exemplary embodiments, in which:

FIG. 1 shows a schematic sectional view in the circumferential direction of a free-wheel, FIG. 2 shows a first sectional view, extending in the axial direction, of the wound outer ring of a free-wheel according to FIG. 1, FIG. 3 shows a further sectional view, extending in the axial direction, of a wound outer ring of a free-wheel according to FIG. 1 with the groove formed, FIG. 4 shows a schematic sectional view in the circumferential direction of a free-wheel with a housing, and FIG. 5 shows a sectional view of a free-wheel according to FIG. 4, which extends in the axial direction.

The free-wheel is composed of a shaft 1 (or of a free-wheel inner ring which is known per se and is not illustrated) and an outer ring 3 of the free-wheel (of which a portion is illustrated), said inner ring and outer ring 3 of the free-wheel being rotatable with respect to one another about a common axis 2 and being arranged one in the other, and thus forming a gap 4. For example three pinch bodies 5, which have, in the radial direction, an internal clamping surface 6 and an external clamping surface 7 which are applied to the shaft 1 and to the outer ring 3 of the free-wheel and thus form a functionally locking connection, are arranged in this gap 4.

In order to secure them positionally, the pinch bodies 5 are inserted into a pinch body cage 8 and are additionally secured by a tension spring 9. The outer ring 3 of the free-wheel can have, on the external diameter, a circumferential groove 11 which is preferably formed before the outer ring 3 of the free-wheel is cured. A ring made of fiber-reinforced plastic 12 is wound into the circumferential groove 11 in order to avoid or reduce widening of the outer ring 3 of the free-wheel.

The fibers are preferably unidirectional. This ensures a high modulus of elasticity of the wound ring made of fiber-reinforced plastic 12, which is higher than the modulus of elasticity of the outer ring 3 of the free-wheel. This ensures that the widening of the entire outer ring 3 of the free-wheel is reduced owing to the contact force of the pinch bodies 5. This reduces the angle of rotation between the shaft 1 and the outer ring 3 of the free-wheel when a torque is acting, which permits the pinch body 5 also to roll in to a lesser degree. This generally results in a higher torque. The lower specific density of the fiber-reinforced plastic reduces the mass of the outer ring 3 of the free-wheel in comparison with that of a solid steel ring. Correspondingly, use in dynamic applications, such as high switching frequencies, is favored. Furthermore, the installation space can be reduced, while maintaining approximately the same torque, by reducing the external diameter of the outer ring 3 of the free-wheel.

The depth of the circumferential groove 11 must be selected in such a way that the effect of the compressive surface loading can be absorbed by the outer ring 3 of the free-wheel made of steel and is not transferred to the wound ring made of fiber-reinforced plastic 12.

In order to accommodate the outer ring 3 of the free-wheel in a corresponding housing 14, preferably two cylindrical fitting surfaces 13 are provided. The height of the wound ring made of fiber-reinforced plastic 12 does not exceed the height of the fitting surfaces 13 here, in order to avoid damage to the ring made of fiber-reinforced plastic 12 when the outer ring 3 of the free-wheel is introduced into the housing 14. In addition, it is also possible to provide a plurality of fitting surfaces 13 between which a plurality of adjacent rings made of fiber-reinforced plastic 12 (not illustrated) are inserted.

FIG. 4 and FIG. 5 show a free-wheel whose outer ring 3 is wound with a ring made of fiber-reinforced plastic 12 over the entire width of the outer ring. The ring made of fiber-reinforced plastic 12 is then in turn surrounded by a housing 14.

In all the illustrations of the free-wheel according to the invention in FIGS. 1–5, the geometrical dimensioning, in particular of the ring made of fiber-reinforced plastic 12 and of the external diameter of the outer ring 3 (and of the housing 14), is highly significant for the operational capability and durability of the free-wheel. According to the invention, in particular the outer ring 3 of the free-wheel is made significantly thinner and narrower than the ring made of fiber-reinforced plastic 12, in particular the size relationships that the external diameter of the ring is approximately 1.3 to 1.8 times, and the external diameter of the outer ring of the free-wheel is 1.02 to 1.1 times, the diameter—measured from the axis 2—of the external clamping surface 7 producing particularly advantageous oscillation properties, which are advantageous and discernable during extended testing, along with dynamic operating characteristics of the free-wheel.

The wall thickness of the outer ring 3 of the free-wheel can be, depending on the overall size, 1–1.5 mm in order to be able to absorb the Hertzian stresses occurring during operation. The hardness of the outer ring 3 of the free-wheel may be, in particular, HRC=60+4.

The outer ring 3 of the free-wheel should be pressed into the ring made of fiber-reinforced plastic 12 with a tight fit. When the elastic parts of the thin-walled steel ring and settling processes which would occur with a loose fit are thus minimized when loading by the pinch bodies 5 occurs. The positive property of the high modulus of elasticity (E-modulus) of the ring made of fiber-reinforced plastic 12 thus becomes immediately effective when the load is taken up. A fitting pair 7, 6 of the ring made of fiber-reinforced plastic 12 and outer ring 3 of the free-wheel, for example, is thus suitable.

The ring made of fiber-reinforced plastic 12 is wound or manufactured, for example, from UHM GY-70 (E-modulus=290 GPa, that is to say 290×10$^3$ N/mm$^2$) (carbon fiber with an ultra high modulus). During manufacture it is necessary to ensure that the fiber is wound in the circumferential direction. Basically all UHM materials which have an E-modulus of at least 210 GPa (that is to say 210×10$^3$ N/mm$^2$) are basically possible.

The ring made of fiber-reinforced plastic 12 cannot be pressed directly into other components since here there is the risk of the fiber being damaged during the pressing in and the properties of the ring being adversely affected.

In order to adapt the invention with other components, the ring made of fiber-reinforced plastic 12 according to FIG. 3 and FIG. 4 can also be surrounded by a housing 14 (or a further ring, in particular an outer ring) which has the function of protecting the ring made of fiber-reinforced plastic 12 and also permitting it to be pressed into other components. The housing 14 should, for reasons of weight, be made with thin walls and be fabricated from a metallic material (for example steel, aluminum wrought alloys etc.). In particular, the wall thickness of the housing 14 or of the ring can correspond approximately to the wall thickness of the outer ring 3 of the free-wheel (cf. FIG. 4 and FIG. 5).

In one particularly advantageous embodiment, the free-wheel according to the invention is used as a weight-saving and low-noise pinch body free-wheel for (high performance) motor cycles (in particular for wheel hubs), as a result of which pinch roller free-wheels which have been used hitherto for reasons of weight and whose noise was tolerated, can be replaced.

REFERENCE NUMERALS

1 Shaft
2 Axis
3 Free-wheel outer ring
4 Gap
5 Pinch body
6 Internal clamping surface
7 External clamping surface
8 Pinch body cage
9 Tension spring
11 Circumferential groove
12 Ring made of fiber-reinforced plastic
13 Fitting surfaces
14 Housing

The invention claimed is:

1. A free-wheel comprising:
  (a) at least first and second elements rotatable with respect to each other about a common axis, said elements being arranged one inside the other and forming a gap, each element having an outer surface;
  (b) a plurality of pinch elements arranged in the gap, each pinch element having a clamping surface with a diameter, the pinch elements being arranged so that a frictionally locking connection is brought about with the outer surfaces of the elements via the clamping surfaces;
  (c) a ring made of fiber-reinforced plastic with fibers wound unidirectionally in circumferential direction around an outer ring of one of the elements, said ring having an external diameter approximately 1.3 to 1.8 times the diameter of one of the external clamping surfaces;

wherein a circumferential groove with side walls of identical height into which the ring made of fiber-reinforced plastic is wound is formed in the outer ring.

2. The free-wheel as claimed in claim 1, wherein the outer ring has an external diameter approximately 1.02 to 1.1 times the diameter of the external clamping surface.

3. The free-wheel as claimed in claim 1,
wherein the modulus of elasticity of the fiber-reinforced plastic is higher than the modulus of elasticity of the outer ring.

4. The free-wheel as claimed in claim 3,
wherein the modulus of elasticity of the fiber-reinforced plastic exceeds 210 GPa.

5. The free-wheel as claimed in claim 1,
wherein the outer ring has fitting surfaces and the height of the ring made of fiber-reinforced plastic does not exceed the fitting surfaces.

6. The free-wheel as claimed in claim 1,
wherein the ring made of fiber-reinforced plastic comprises a plurality of winding layers.

7. The free-wheel as claimed in claim 6,
wherein the winding layers of the ring made of fiber-reinforced plastic are arranged essentially unidirectionally in the circumferential direction.

8. The free-wheel according to claim 1 wherein the free wheel is a pinch roller free-wheel or a pinch body free-wheel and the pinch elements are pinch rollers or pinch bodies.

* * * * *